United States Patent
Dewa et al.

(10) Patent No.: US 9,451,333 B2
(45) Date of Patent: *Sep. 20, 2016

(54) TRANSMISSION APPARATUS, AIT TRANSMISSION METHOD AND RECEPTION APPARATUS

(71) Applicant: Sony Corporation, Tokyo (JP)

(72) Inventors: Yoshiharu Dewa, Tokyo (JP); Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,556

(22) Filed: Jun. 19, 2014

(65) Prior Publication Data

US 2014/0304759 A1    Oct. 9, 2014

Related U.S. Application Data

(63) Continuation of application No. 13/591,448, filed on Aug. 22, 2012, now Pat. No. 8,793,754.

(60) Provisional application No. 61/528,466, filed on Aug. 29, 2011.

(51) Int. Cl.
*H04N 7/173* (2011.01)
*H04H 20/95* (2008.01)
*H04H 20/93* (2008.01)
*H04N 21/647* (2011.01)
(Continued)

(52) U.S. Cl.
CPC ........ *H04N 21/64784* (2013.01); *H04H 20/93* (2013.01); *H04H 20/95* (2013.01); *H04N 21/4345* (2013.01); *H04N 21/462* (2013.01); *H04N 21/8166* (2013.01); *H04N 21/8186* (2013.01); *H04N 21/8545* (2013.01); *H04H 60/82* (2013.01)

(58) Field of Classification Search
CPC ...... H04H 20/93; H04H 20/95; H04H 60/82; H04N 21/4345; H04N 21/462; H04N 21/64784; H04N 21/8166; H04N 21/8186; H04N 21/8545
See application file for complete search history.

(56) References Cited

U.S. PATENT DOCUMENTS

2007/0112786 A1*  5/2007  Shin ................. H04N 21/26208
2011/0093895 A1*  4/2011  Lee .................... H04N 21/4432
                                                            725/40

(Continued)

OTHER PUBLICATIONS

Extended European Search Report issued on Feb. 26, 2015 in patent application No. 12827185.5.

(Continued)

*Primary Examiner* — Benjamin R Bruckart
*Assistant Examiner* — Jen-Shi Huang
(74) *Attorney, Agent, or Firm* — Chip Law Group

(57) ABSTRACT

Disclosed herein is a transmission apparatus, including: an application data transmission section adapted to transmit data of an application for HbbTV; and an AIT transmission section adapted to transmit an AIT including an application profile which represents one or more additional functions to the application and is configured from a first bit region of high-order n bits and a second bit region of Lower-order (16-n) bits which represent presence or absence of functions allocated to bit positions thereof with a bitmap structure and wherein, in the first bit region, values for changing over the functions to be allocated to the bit positions in the second bit region are set.

14 Claims, 5 Drawing Sheets

(51) Int. Cl.
*H04N 21/462* (2011.01)
*H04N 21/434* (2011.01)
*H04N 21/8545* (2011.01)
*H04N 21/81* (2011.01)
*H04H 60/82* (2008.01)

(56) References Cited

U.S. PATENT DOCUMENTS

2012/0284749 A1* 11/2012 Lee ..................... H04N 21/235 725/39
2013/0019265 A1* 1/2013 Waller ............................ 725/40

OTHER PUBLICATIONS

DVB Organization, "Digital Video Broad Casting (DVB): Signalling and carriage of interactive applications and services in hybrid broadcast/broadband environments" Draft ETSI ES 2XX XXX v<m.t.e.> (Feb. 2009), tm-mis-0053r11-hybrid-application-signalling-draft.doc, Geneva, CH, Sep. 21, 2009, pp. 1-98.
Office Action issued Dec. 2, 2014 in Japanese Patent Application No. 2014-222889 (with English language translation).
Office Action issued Dec. 2, 2014 in Japanese Patent Application No. 2014-222890 (with English language translation).
Office Action issued Dec. 2, 2014 in Japanese Patent Application No. 2014-222891 (with English language translation).
Specification of Japanese Patent Application No. 2014-222890 Filed Oct. 31, 2014.
Specification of Japanese Patent Application No. 2014-222891 Filed Oct. 31, 2014.
Specification of Japanese Patent Application No. 2014-222889 Filed Oct. 31, 2014.
"Hybrid Broadcast Broadband TV", ETSI TS 102 796, V1.1.1 (Jun. 2010), Technical Specification, © European Telecommunications Standards Institute 2010, © European Broadcasting Union 2010, 75 Pages.
International Preliminary Report on Patentability issued Dec. 6, 2013, in PCT/JP2012/005215, filed Aug. 21, 2012.
"Application Execution Engine Platform for Digital Broadcasting", ARIB Standard, ARIB STD-B23, Version 1. 2, Association of Radio Industries and Businesses, Jul. 29, 2009, 1 front page, pp. 39-73.
International Search Report Issued Nov. 20, 2012 in PCT/JP2012/005215.
"Digital Video Broadcasting (DVB); Signalling and carriage of interactive applications and services in Hybrid broadcast/broadband environments", ETSI TS 102 809, V1.1.1, Jan. 2010, pp. 14-35 and cover page.
Card, Rémy. & Ts'o, Theodore. & Tweedie, Stephen (1994). "Design and Implementation of the Second Extended Filesystem". Proceedings of the First Dutch International Symposium on Linux. ISBN 90-367-0385-9.
European Search Report Received for European Patent Application No. 15191370.4, Mailed on Feb. 25, 2016, pp. 7.
European Search Report Received for European Patent Application No. 15191448.8, Mailed on Jan. 29, 2016, pp. 7.
European Search Report Received for European Patent Application No. 15191061.9, Mailed on Feb. 3, 2016, pp. 5.

* cited by examiner

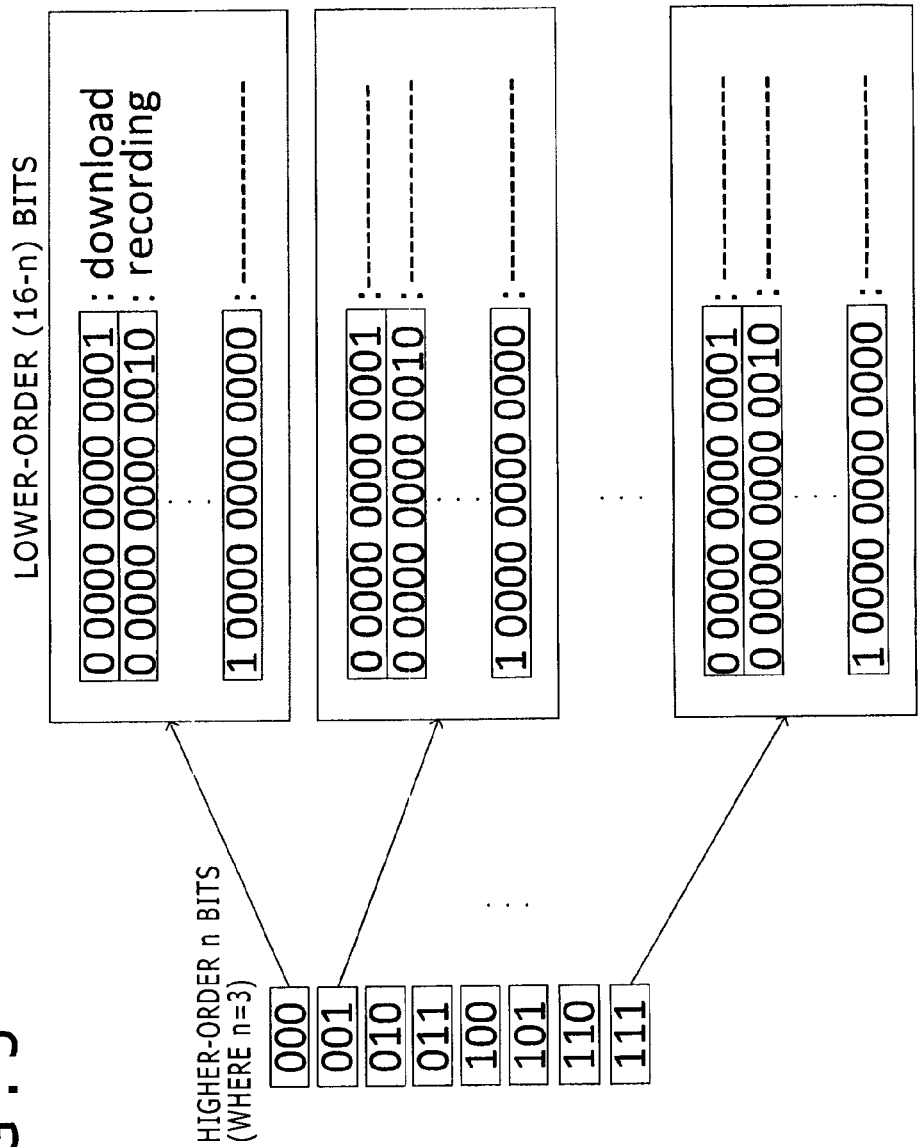

TRANSMISSION APPARATUS, AIT TRANSMISSION METHOD AND RECEPTION APPARATUS

CROSS-REFERENCE TO RELATED APPLICATION

This application is a continuation of U.S. application Ser. No. 13/591,448 filed Aug. 22, 2012, which claims the benefit of priority to Provisional Application Ser. No. 61/528,466, filed on Aug. 29, 2011. The entire contents of each of the forgoing applications is incorporated herein by reference.

BACKGROUND

The present technology relates to a transmission apparatus, an AIT transmission method and a reception apparatus adopted by the HbbTV system.

The HbbTV (Hybrid broadcast broadband TV) originates from integration of specifications of the Interactive TV drafted in Germany and France. The HbbTV is based on Web technologies or existing standards, and as a result, re-utilization of a server environment or an application development environment is facilitated. In order to implement more abundant viewing experience of the TV, the HbbTV structures a composite environment of broadcasting of a TV receiver and a broadband (IP (Internet Protocol) network). The HbbTV does not depend on a transmission layer such as a ground wave, a satellite, a cable or the like. Thus, in Germany, the service is started in December, 2009 and, in France, it is scheduled to start the service within 2011.

In Europe, a descriptor called AIT (Application Information Table) for management of an interactive application is prescribed. An ES (Engineering Service) by which an AIT is transmitted by data coding identification disposed in a PMT (Program Map Table) which is one piece of PSI (Program Specific Information) of the MPEG-2 (Moving Picture Experts Group phase 2) system is designated and another ES by which the AIT is transmitted by data coding identification transmitted with an independent ES is designated, and transmission is carried out by the independent ES. While the AIT has a field in which a profile (application profile) of a function or the like added to an interactive application can be described, operation of the application profile is entrusted to individual services.

A platform profile is a field in which information regarding a function which an application has is described. As the function which an application has, download, recording, download and reproduction at the same time by a RTSP (Real Time Streaming Protocol), content protection by DRM (Digital Rights Management), adaptive streaming and so forth of an A/V (Audio/Visual) content are available. Various functions are available other than the functions just described, and it is expected that the number of functions increases in the future.

SUMMARY

The number of bits given to the field for a platform profile is 16 in the standard. Generally, a bitmap structure in which one function is allocated to each of the bit positions of the 16 bits is adopted for the platform profile. By adopting the bitmap structure, 16 functions in the maximum can be represented in one platform profile. However, the number of kinds of additional functions to an application is inclined to increase in the future. Accordingly, it is expected that, in the structure of the platform profile in which 16 bits at present are used as a bitmap, a situation occurs that the representation capacity becomes insufficient.

Taking such a situation as described above into consideration, it is an object of the present technology to provide a transmission apparatus, an AIT transmission method and a reception apparatus by which enhancement of the representation capacity of a platform profile for describing an additional function to an application in the HbbTV can be achieved.

According to an embodiment of the present technology, a transmission apparatus includes an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16−n) bits which represent presence or absence of functions allocated to bit positions thereof with a bitmap structure and wherein, in the first bit region, values for changing over the functions to be allocated to the bit positions in the second bit region are set.

n may be one of values within a range from 2 to 14, preferably one of values within a range from 2 to 5.

Where all additional functions to the application cannot be represented by one application profile, the AIT transmission section may transmit a plurality of AITs including a plurality of application profiles in which values in the first bit regions are different from each other.

The transmission apparatus may further include a content transmission section adapted to transmit data of a content.

According to another embodiment of the present technology, an AIT transmission method includes transmitting an AIT including an application profile which represents one or more additional functions to the application for HbbTV and is configured from a first bit region of higher-order n bits and a second bit region of lower-order (16−n) bits which represent presence or absence of functions allocated to bit positions with a bitmap structure and wherein, in the first bit region, values for changing over the functions to be allocated to the bit positions in the second bit region are set.

According to a further embodiment of the present technology, a reception apparatus includes a reception section adapted to receive application data and an AIT transmitted from a transmission apparatus including an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16−n) bits which represent presence or absence of functions allocated to bit positions thereof with a bitmap structure and wherein, in the first bit region, values for changing over the functions to be allocated to the bit positions in the second bit region are set, and a decision section adapted to analyze the application profile included in the received AIT to decide the additional function of the received application.

The decision section may decide the additional function to the same application analyzed from a plurality of platform profiles in the plural AITs received at intervals by ORing.

As described above, with the present technology, enhancement of the representation capacity of a platform profile for describing an additional function to an application in the HbbTV can be achieved.

BRIEF DESCRIPTION OF THE DRAWINGS

FIG. 5 is a view showing a structure of an application profile in the AIT of FIG. 4.

DETAILED DESCRIPTION OF THE PREFERRED EMBODIMENTS

In the following, an embodiment according to the present technology is described with reference to the drawings.

[HbbTV System]

Figure 1:
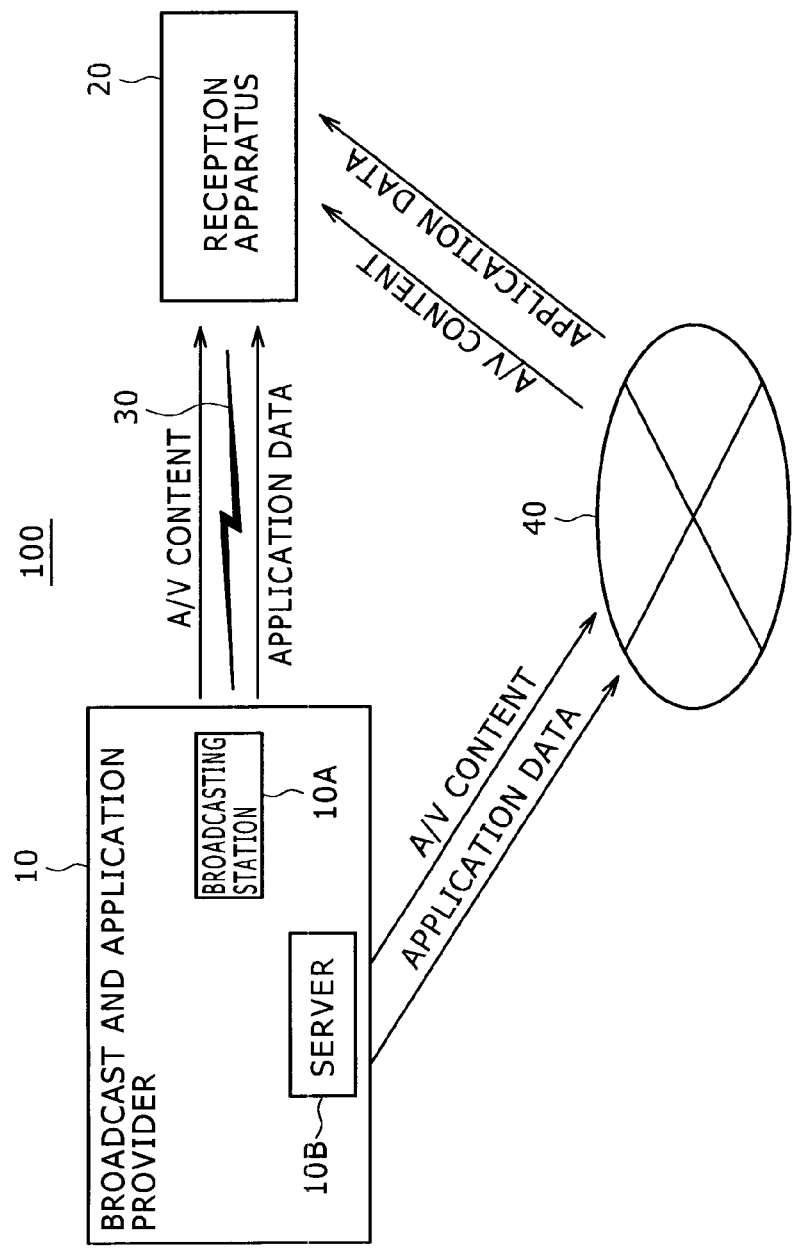
FIG. 1 is a view showing a configuration of an HbbTV system according to an embodiment of the present technology.

FIG. 1 is a view showing a configuration of an HbbTV system according to the embodiment of the present technology.

The HbbTV system 100 includes a broadcast and application provider 10, a reception apparatus 20 and a transmission system such as the Internet 40, broadcasting 30 and so forth. The broadcast and application provider 10 includes a broadcasting station 10A for broadcasting a linear A/V content and interactive application data. Further, the broadcast and application provider 10 includes a server apparatus for delivering a non-linear A/V content and application data to the reception apparatus 20 through the Internet. A server 10B delivers the non-linear A/V content and the application data in response to a request from the reception apparatus 20 through the Internet.

The linear A/V content and the non-linear A/V content are a transport stream of the MPEG-2/Video or the like. An application includes, for example, a GUI (Graphical User Interface) which rouses the user so that a non-linear A/V content is downloaded and reproduced and receives a reproduction instruction from the user, a URL (Uniform Resource Locator) of the non-linear A/V content and so forth. In the HbbTV, the MPEG-2/Video or the like is adopted as a data format for an A/V content and the CE (Consumer Electronics)—HTML (Hyper Text Markup Language) or the like is adopted as a data format for a document.

The broadcasting station included in the broadcast and application provider 10 produces an AIT and broadcasts a broadcasting AIT. The server 10B can produce an XML-AIT (Extensible Markup Language-AIT) having the substance equivalent to that of the broadcasting AIT and delivers the produced XML-AIT in response to a request from the reception apparatus 20.

[Configuration of the Transmission Apparatus]

Figure 2:
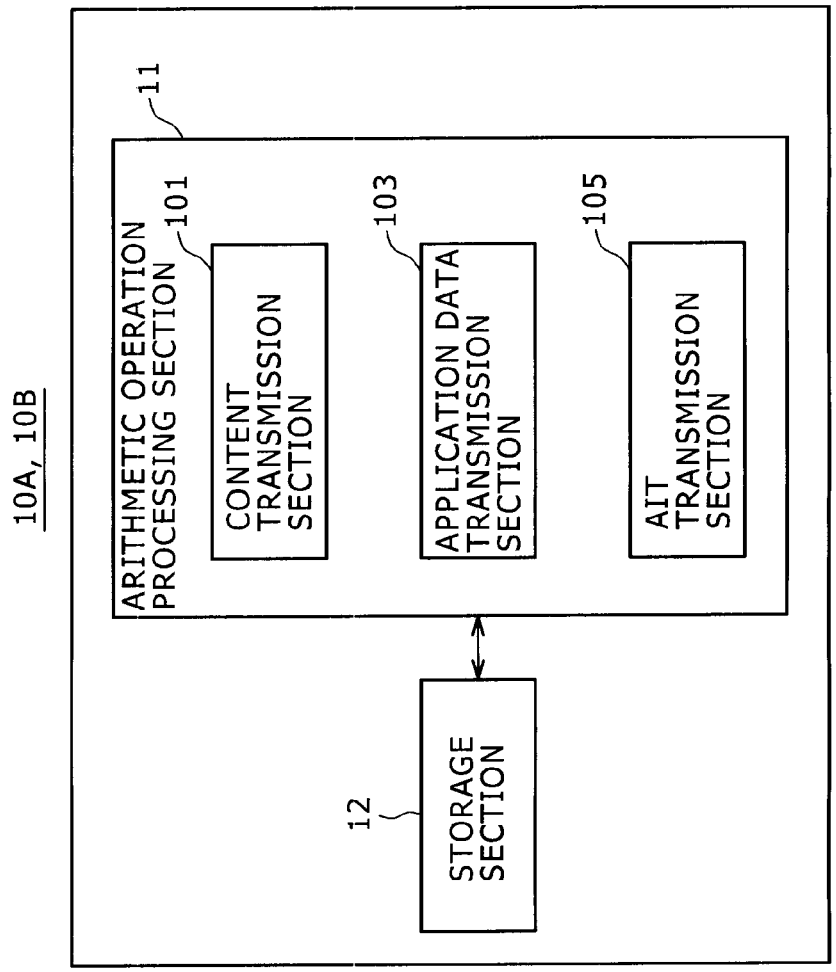
FIG. 2 is a block diagram showing a configuration of a transmission apparatus ready for the HbbTV system of the embodiment.

FIG. 2 is a block diagram showing a configuration of a transmission apparatus ready for the HbbTV system of the embodiment. The transmission apparatus particularly is the broadcasting station 10A and the server 10B included in the broadcast and application provider 10.

The transmission apparatus includes an arithmetic operation processing section 11 and a storage section 12. The arithmetic operation processing section 11 includes a CPU (Central Processing Unit), a main memory and a ROM (Read Only Memory). The storage section 12 is, for example, a large-capacity storage apparatus such as a hard disk drive.

The arithmetic operation processing section 11 includes, as a functional module configured by the CPU executing an arithmetic operation process based on a program stored in the main memory, a content transmission section 101 for transmitting a non-linear A/V content or a linear A/V content, an application data transmission section 103 for transmitting application data for the HbbTV and an AIT transmission section 105 for transmitting an AIT including an application profile. The storage section 12 stores the A/V content, application data and AIT transmitted thereto from the content transmission section 101, application data transmission section 103 and AIT transmission section 105.

The AIT transmission section 105 is configured from a first bit region of higher-order n bits and a second bit region of lower-order (16−n) bits of a bitmap structure and transmits an AIT including an application profile of 16 bits for specifying an additional function to the application through the broadcasting 30 or the Internet 40.

[Configuration of the Reception Apparatus]

Figure 3:
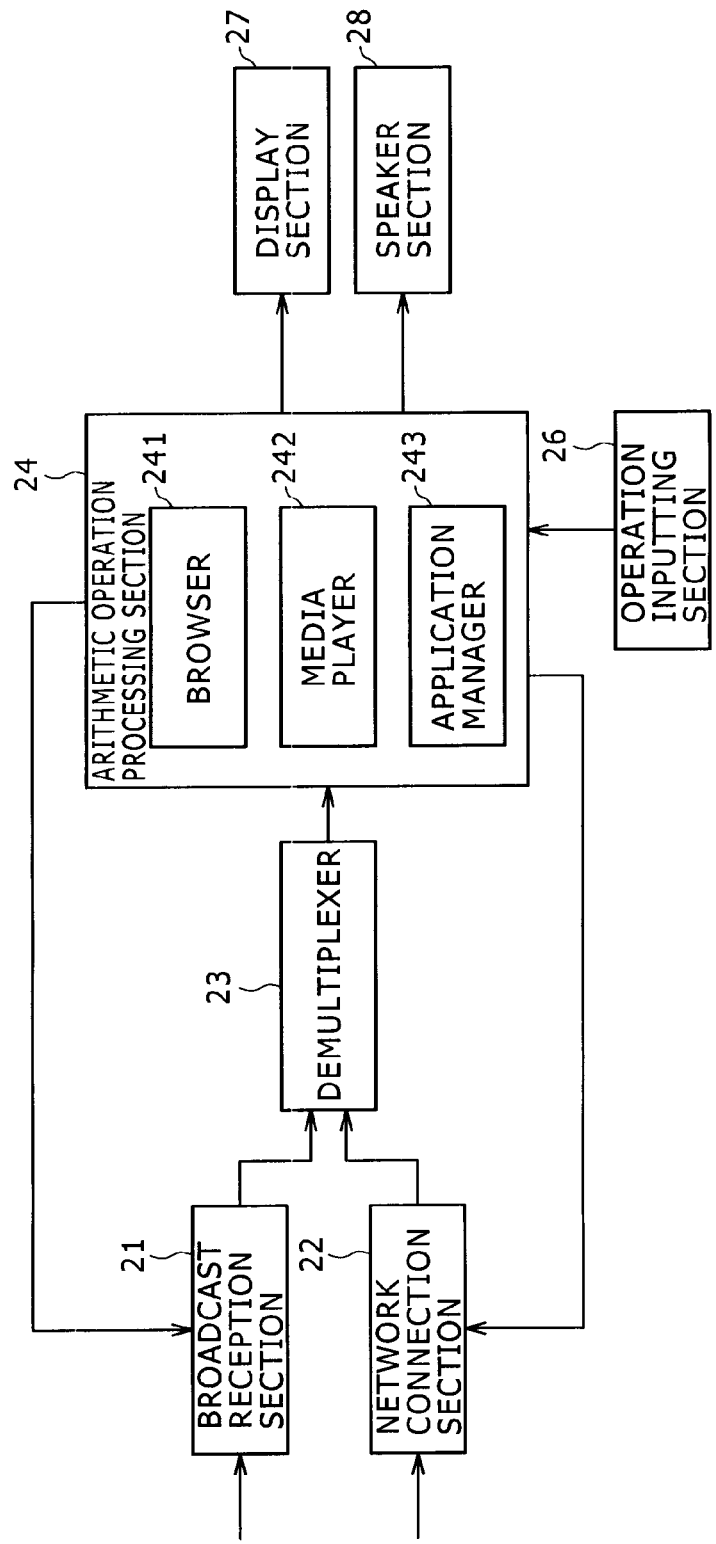
FIG. 3 is a block diagram showing a configuration of a reception apparatus ready for the HbbTV system of the embodiment.

FIG. 3 is a block diagram showing a configuration of the reception apparatus 20 ready for the HbbTV system of the embodiment.

The reception apparatus 20 is an electronic equipment capable of receiving an A/V content and application data provided from the broadcast and application provider 10 through the transmission systems of the broadcasting 30 and the Internet 40 and carrying out a process such as reproduction and so forth. More particularly, the reception apparatus 20 is a television set, a personal computer, a portable telephone set or the like.

The reception apparatus 20 includes a broadcast reception section 21 (reception section), a network connection section 22 (reception section), a demultiplexer 23, an arithmetic operation processing section 24, an operation inputting section 26, a display section 27 and a speaker section 28.

The broadcast reception section 21 receives an A/V content, application data and a broadcast AIT broadcasted as a transport stream from the broadcast and application provider 10. The network connection section 22 can process the connection to the Internet 40 to access the server 10B of the broadcast and application provider 10 to receive an A/V content, application data and an XML-AIT.

The demultiplexer 23 separates a video, an audio, an AIT and so forth from the transport stream received by the broadcasting reception section 21 and the network connection section 22.

The arithmetic operation processing section 24 includes a CPU (Central Processing Unit), a main memory and a ROM (Read Only Memory). In the main memory or the ROM, a browser 241, a media player 242 and an application manager 243 (decision section) are stored as software. The browser 241 carries out a displaying process of the application data. The media player 242 carries out a reproduction process of an A/V content. The application manager 243 analyzes an AIT to control start-up and stopping of the application. The application manager 243 analyzes the substance of a platform profile in the AIT to decide an additional function to the application.

The operation inputting section 26 receives an inputting operation from the user to issue a notification to the arithmetic operation processing section 24. The operation inputting section 26 may be configured from a key operation section provided on the main body of the reception apparatus 20, a remote controller or the like.

The display section 27 displays a document or an image processed by the browser 241 and a video of the A/V content reproduced by the media player 242. The speaker section 28 outputs, for example, an audio of the A/V content reproduced by the media player 242.

[AIT]

Now, the AIT is described.

The AIT is control information relating to the lifecycle of an application. As control information relating to the lifecycle of an application, for example, "AUTOSTART," "PRESENT," "DESTROY" and so forth are available. "AUTOSTART" is information for the instruction to start the application immediately. "PRESENT" is information for the instruction to receive the application by the reception apparatus 20 although it is not automatically executed. "DESTROY" is information for the instruction to stop the application. A hybrid terminal can acquire and start up an application designated, for example, so as to be started immediately based on control information relating to the lifecycle in the AIT.

Figure 4:
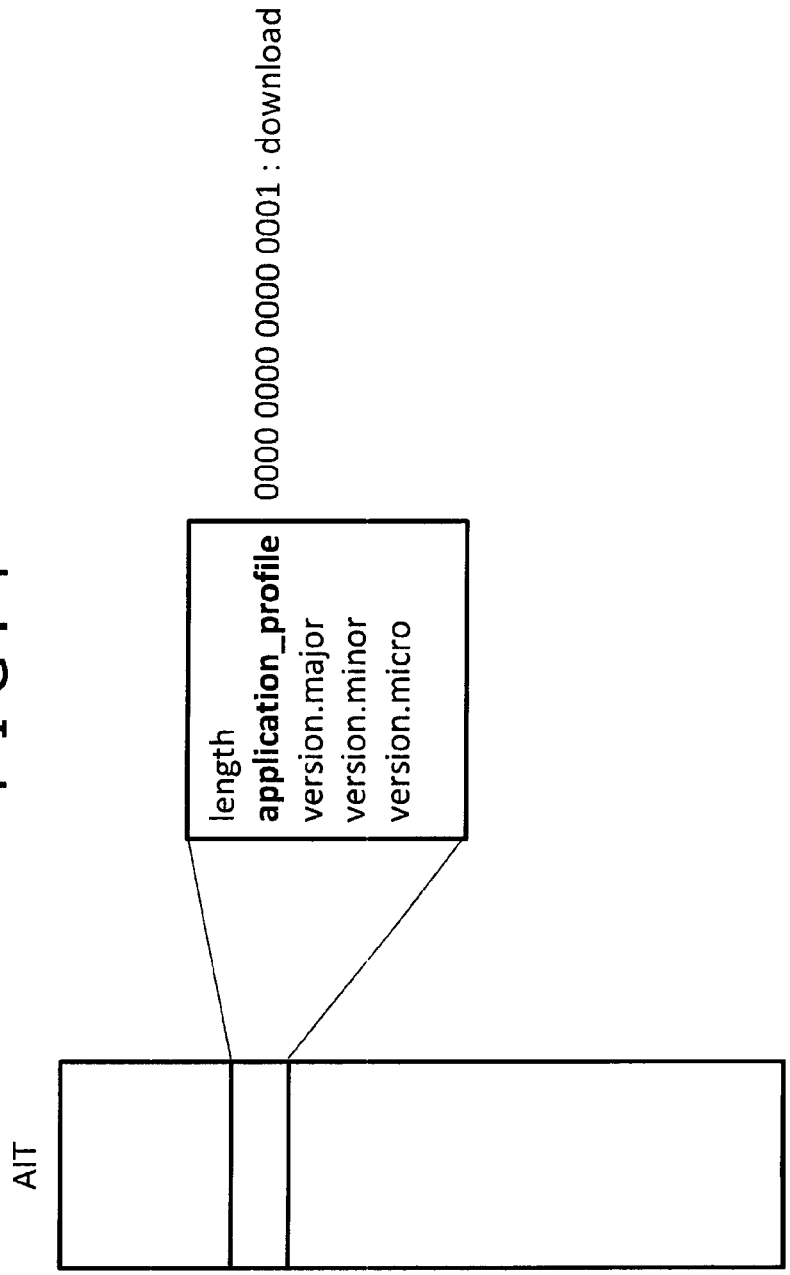
FIG. 4 is a view showing a configuration of an AIT.

As illustrated in FIG. 4, the AIT has a field for a platform profile. The platform profile is a field in which information relating to functions which the application has is described. The functions which the application has are, for example, download, recording, download and simultaneous reproduction by the RTSP (Real Time Streaming Protocol), content protection by DRM (Digital Rights Management), adaptive streaming and so forth of an A/V content. Various other functions are available, and it is expected that functions increase in future.

The bit number given to the field for a platform profile is 16 bits according the standard. Generally, one function is allocated to the position of each of bits in an array of 16 bits. For example, functions are allocated in the following manner.

"0000 0000 0000 0000" no function
"0000 0000 0000 0001" download
"0000 0000 0000 0010" recording
"0000 0000 0000 0100" *RTSP*
"0000 0000 0000 1000" *DRM*
"0000 0000 0001 0000" adaptive streaming
...
"1000 0000 0000 0000"

Accordingly, in a general AIT, only up to 16 functions can be represented.

It is to be noted that, in order to represent that two functions of download and recording are available, the bits at the bit positions individually allocated to them may be set to "1" like
"0000 0000 0000 0011"

In the HbbTV system of the present embodiment, the totaling 16 bits of an application profile are handled separately for a first bit region of higher-order n bits, and a second bit region of lower-order (16−n) bits which represent presence or absence of a function allocated to each bit position in a bitmap structure. In the first bit region, values for changing over functions allocated to the individual bit positions of the second bit region are set. In particular, as illustrated in FIG. 5, although one function is allocated to each bit position in the second bit region similarly as in an ordinary case, the types of the functions rely upon the values in the first bit region.

For example, in the case of N=3, although
"0000 0000 0000 0001"
represents download,
"0010 0000 0000 0001"
represents a different function, and all of
"0100 0000 0000 0001"
"0110 0000 0000 0001"
"1000 0000 0000 0001"
"1010 0000 0000 0001"
"1100 0000 0000 0001"
"1110 0000 0000 0001"
represent different functions from one another.

If it is assumed that n is n=3, then the second bit region includes 13 bits. Accordingly, 13 functions can be represented for one dimension. Meanwhile, since totaling eight dimensions can be represented by the first bit region of 3 bits, 13×8=104 functions can be represented by the field for an application profile of 16 bits.

Incidentally, according to the method described above, if n is set to n=4, then 176 functions can be represented, and if n is set to n=5, then 320 functions can be represented. In particular, as the number of bits to be utilized as the first bit region increases, the number of functions which can be represented increases. In this sense, n can be set to a value ranging from 2 to 14.

However, if the number of bits to be utilized as the first bit region is increased to decrease the second bit region, then the maximum number of functions which can be represented by one application profile decreases, and in order to convey all functions, the values of the first bit region are changed to transmit many application profiles. Accordingly, the number of bits to be utilized as the first bit region should be selected optimally in response to the total number of kinds of available functions within the range from 2 to 5. The reason is that, even if the total number of functions which can be represented is increased to 640 or more by setting the bit number of the first bit region to 6 or more, it seems less likely to occur that the number of kinds of functions increases to such number in future and the demerit caused by decrease of the number of functions which can be represented by one application profile is significant.

In the transmission apparatus of the broadcast and application provider 10, the AIT transmission section 105 transmits an AIT including an application profile structured in such a manner as described above to the reception apparatus 20 through the broadcasting 30 or the Internet 40.

In the reception apparatus 20, a video, an audio, an AIT and so forth are separated from a transport stream received by the broadcast reception section 21 and the network connection section 22 by the demultiplexer 23. The separated AIT is analyzed by the application manager 243. In the analysis of the AIT, the application manager 243 analyzes the AIT in accordance with the structure of the platform profile in the AIT to decide an additional function to the application.

The application manager 243 decides the additional function analyzed from a plurality of platform profiles received at intervals for the same application by ORing. Consequently, when the transmission apparatus cannot represent all functions using one platform profile because of the number of such functions, it can distribute the functions to a plurality of platform profiles and transmit the functions to the reception apparatus 20.

In this manner, even with a platform profile restricted to a field of 16 bits, the number of functions which can be represented can be increased greatly by using the higher-order n bits as information for making the allocation of the functions allocated to bit positions of second bit region of lower-order (16−n) bits plural dimension.

It is to be noted that the present technology can adopt such configurations as described below.

(1) A transmission apparatus, including:
an application data transmission section adapted to transmit data of an application for HbbTV; and
an AIT transmission section adapted to transmit an AIT including an application profile which represents one or more additional functions to the application and is configured from a first bit region of high-order n bits and a second bit region of lower-order (16−n) bits which represent presence or absence of functions allocated to bit positions thereof with a bitmap structure and wherein, in the first bit region, values for changing over the functions to be allocated to the bit positions in the second bit region are set.

(2) The transmission apparatus according to (1), wherein the n is one of values within a range from 2 to 14.

(3) The transmission apparatus according to (1), wherein the n is one of values within a range from 2 to 5.

(4) The transmission apparatus according to any one of (1) to (3), wherein, where all additional functions to the application cannot be represented by one application profile, the AIT transmission section transmits a plurality of AITs including a plurality of application profiles in which values in the first bit regions are different from each other.

(5) The transmission apparatus according to any one of (1) to (4), further including a content transmission section adapted to transmit data of a content.

(6) A reception apparatus, including:
a reception section adapted to receive application data and an AIT transmitted from a transmission apparatus including an application data transmission section adapted to transmit data of an application for HbbTV, and an AIT transmission section adapted to transmit an AIT including an application profile which represents one or more additional functions to the application and is configured from a first bit region of high-order n bits and a second bit region of lower-order (16−n) bits which represent presence or absence of functions allocated to bit positions thereof with a bitmap structure and wherein, in the first bit region, values for changing over the functions to be allocated to the bit positions in the second bit region are set; and
a decision section adapted to analyze the application profile included in the received AIT to decide the additional function of the received application.

(7) The reception apparatus according to (6), wherein n is one of values within a range from 2 to 14.

(8) The reception apparatus according to (6), wherein n is one of values within a range from 2 to 5.

(9) The reception apparatus according to any one of (6) to (8), wherein the decision section decides the additional function to the same application analyzed from a plurality of platform profiles in the plural AITs received at intervals by ORing.

It should be understood by those skilled in the art that various modifications, combinations, sub-combinations and alterations may occur depending on design requirements and other factor in so far as they are within the scope of the appended claims or the equivalents thereof.

What is claimed is:

1. A transmission apparatus comprising:
application data transmission circuitry configured to transmit data regarding an application; and
table transmission circuitry to transmit data regarding a plurality of tables including a plurality of application profiles each representing one or more types of functions relating to the application, wherein bit values in a plurality of first bit regions associated with the plurality of application profiles are different from each other,
wherein presence or absence of the one or more types of functions is represented by a first bit region of higher-order bits and a second bit region of lower-order bits, and
wherein different bit values in the first bit region represent different types of functions related to the application.

2. The transmission apparatus according to claim 1, wherein a number of the higher-order bits ranges from 2 to 14.

3. The transmission apparatus according to claim 1, wherein a number of the higher-order bits ranges from 2 to 5.

4. The transmission apparatus according to claim 1, further comprising content transmission circuitry configured to transmit data regarding A/V content.

5. The transmission apparatus according to claim 1, wherein the different bit values in the first bit region correspond to a same bit position in the second bit region.

6. A table transmission method, comprising:
transmitting a plurality of tables including a plurality of application profiles each representing one or more types of functions relating to an application, wherein bit values in a plurality of first bit regions associated with the plurality of application profiles are different from each other,
wherein presence or absence of the one or more types of functions is represented by a first bit region of higher-order bits and a second bit region of lower-order bits, and
wherein different bit values in the first bit region represents different types of functions related to the application.

7. The table transmission method according to claim 6, wherein a number of the higher-order bits ranges from 2 to 14.

8. The table transmission method according to claim 6, wherein a number of the higher-order bits ranges from 2 to 5.

9. The table transmission method according to claim 6, wherein the different bit values in the first bit region correspond to a same bit position in the second bit region.

10. A reception apparatus comprising:
reception circuitry configured to receive data regarding an application from application data transmission circuitry of a transmission apparatus, and a plurality of tables from table transmission circuitry of the transmission apparatus, wherein each of the plurality of tables includes an application profile representing one or more types of functions relating to the application, wherein bit values of a plurality of bit regions associated with the plurality of application profiles are different from each other,
wherein presence or absence of the one or more types of functions is represented by a first bit region of higher-order bits and a second bit region of lower-order bits, and
wherein different bit values in the first bit region represent different types of functions related to the application; and
decision circuitry to analyze the plurality of application profiles included in the received table to determine the one or more types of functions of the plurality of application profiles.

11. The reception apparatus according to claim 10, wherein a number of the higher-order bits ranges from 2 to 14.

12. The reception apparatus according to claim 10, wherein a number of the higher-order bits ranges from 2 to 5.

13. The reception apparatus according to claim 10, wherein said decision circuitry determines the one or more types of functions for a same application by analyzing a plurality of platform profiles in a plurality of tables received at intervals.

14. The reception apparatus according to claim 10, wherein the different bit values in the first bit region correspond to a same bit position in the second bit region.

* * * * *